United States Patent [19]
Funches

[11] Patent Number: 5,844,743
[45] Date of Patent: Dec. 1, 1998

[54] VELOCITY SENSING USING ACTUATOR COIL BACK-EMF VOLTAGE

[75] Inventor: Otis L. Funches, Oklahoma City, Okla.

[73] Assignee: Seagate Technology, Inc., Scotts Valley, Calif.

[21] Appl. No.: 771,314

[22] Filed: Dec. 20, 1996

[51] Int. Cl.[6] .................................................. G11B 5/596
[52] U.S. Cl. ..................................... 360/78.04; 360/78.01
[58] Field of Search ................................ 360/78.04, 75, 360/77.05, 78.14, 78.01; 369/43, 32, 44.28, 124

[56] References Cited

U.S. PATENT DOCUMENTS 4,967,291  10/1990  Touchton et al. .
5,136,439   8/1992  Weispfenning et al. .
5,262,907  11/1993  Duffy et al. .

*Primary Examiner*—Muhammad N. Edun
*Attorney, Agent, or Firm*—Crowe & Dunlevy

[57] ABSTRACT

Apparatus and method for improved positional control in a disc drive servo loop, wherein the actual velocity of rotary actuator is sensed from the motion-induced back-emf generated by movement of a coil of the actuator through the magnetic field of a voice coil motor. A current sense resistor is used in conjunction with the coil to provide closed loop control of the current applied to the coil. Signals indicative of the voltages across the serial combination of the coil and current sense resistor are provided to a velocity sense circuit, which determines the velocity of the coil by generating and subtracting out values for the dc voltage drops across the coil and the current sense resistor and the ac voltage drop across the coil. A compensation routine is provided to compensate for variations in temperature of the coil during operation. The sensed velocity of the coil is thereafter used in conjunction with other conventionally obtained measurements of estimates of head velocity to improve the accuracy and the reliability of the servo loop.

13 Claims, 4 Drawing Sheets

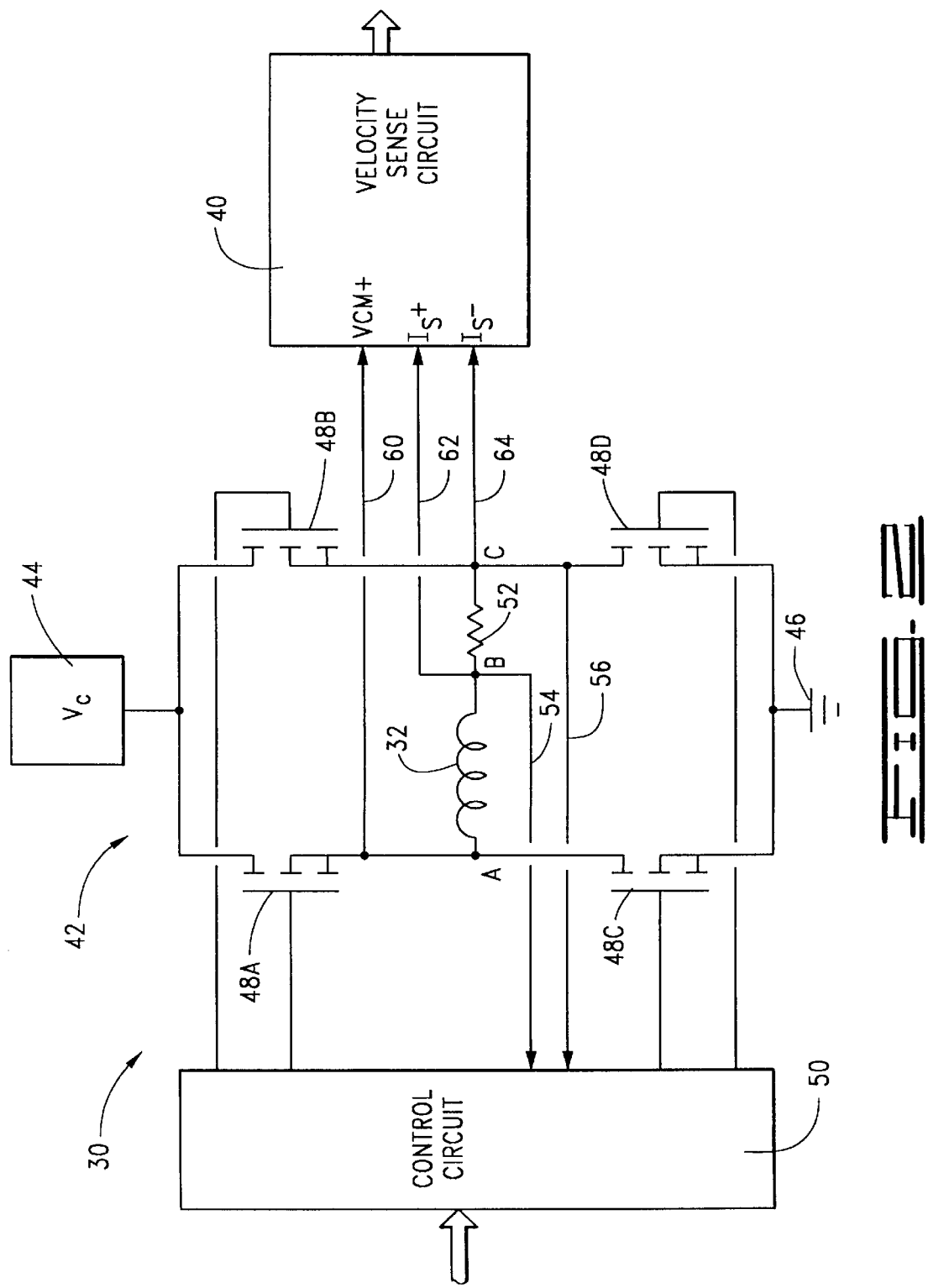

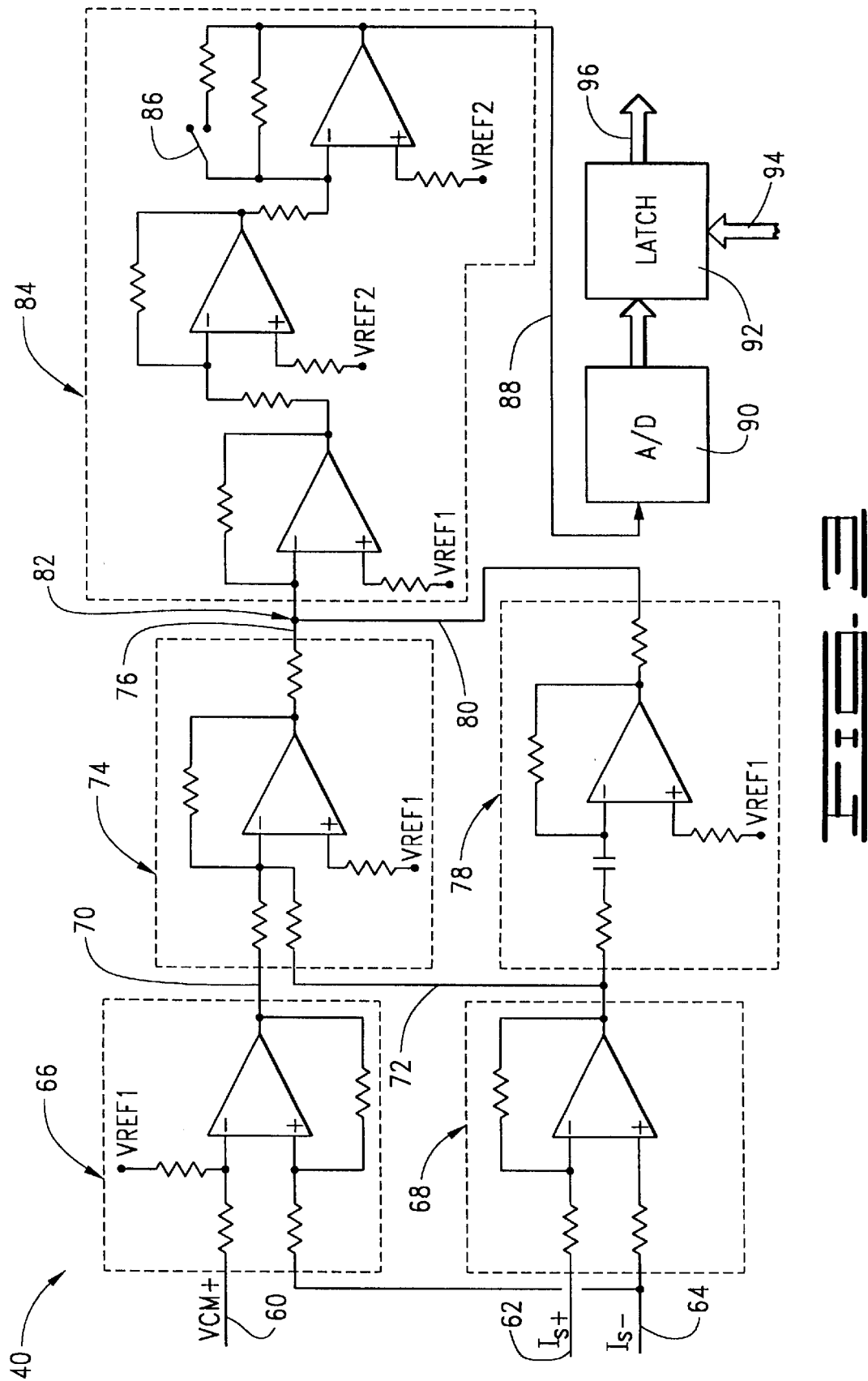

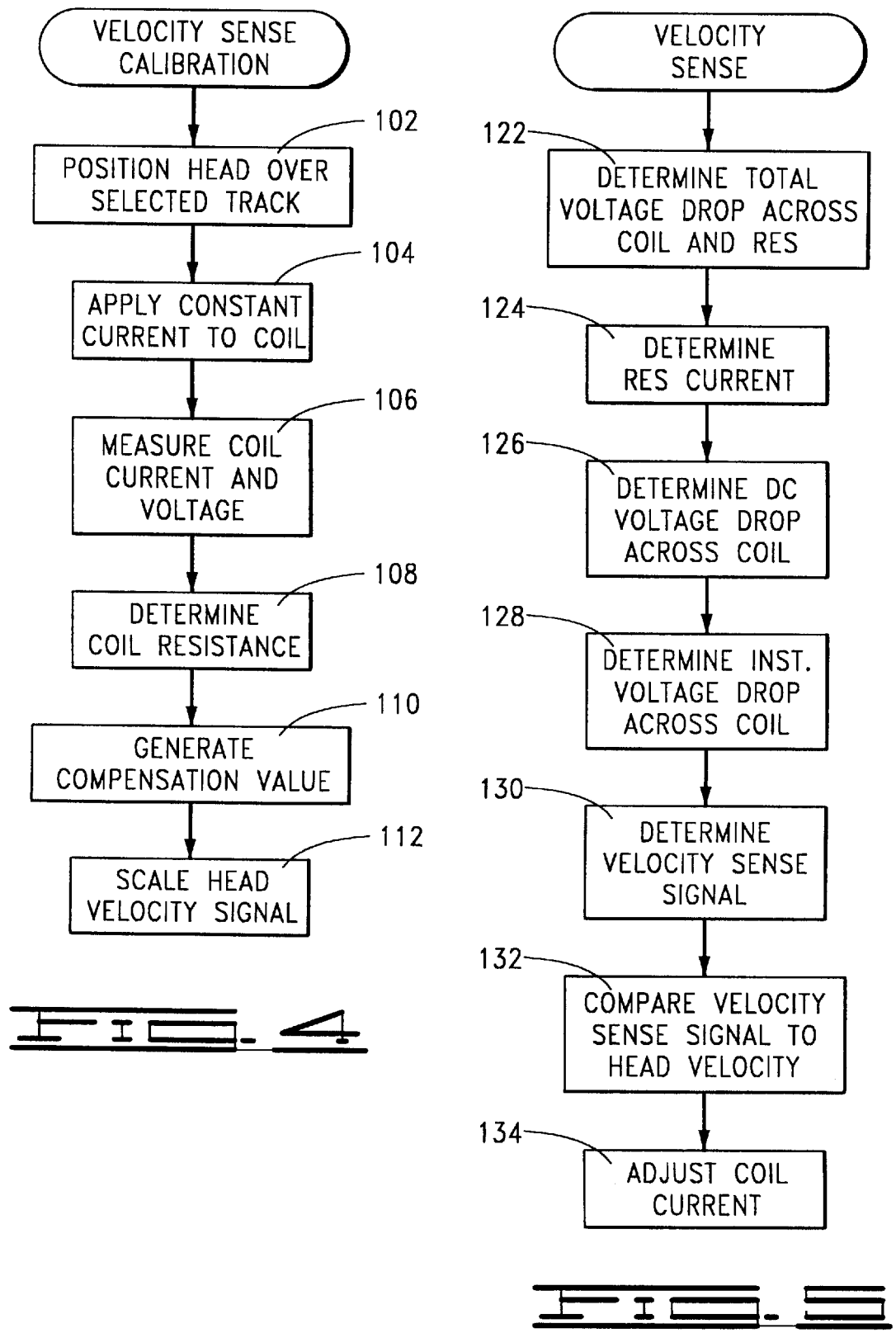

VELOCITY SENSING USING ACTUATOR COIL BACK-EMF VOLTAGE

BACKGROUND OF THE INVENTION

This invention relates generally to the field of disc drive data storage devices, and more particularly, but not by way of limitation, to an apparatus and method for sensing the rotational velocity of a disc drive actuator using the motion induced back-emf voltage of the actuator coil.

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a rotary actuator for movement of the heads relative to the discs.

The heads are mounted via flexures at the ends of a plurality of arms which project radially outward from a substantially cylindrical actuator body. The actuator body pivots about a shaft mounted to the disc drive housing at a position closely adjacent the outer extreme of the discs. The pivot shaft is parallel with the axis of rotation of the spindle motor and the discs so that the heads move in a plane parallel with the surfaces of the discs.

Typically, the actuator employs a voice coil motor to position the heads with respect to the disc surfaces. The actuator voice coil motor includes a coil mounted on the side of the actuator body opposite the head arms so as to be immersed in the magnetic field of an array of permanent magnets. When controlled DC current is passed through the coil, an electromagnetic field is set up which interacts with the magnetic field of the permanent magnets and causes the coil to move relative to the permanent magnets in accordance with the well-known Lorentz relationship. As the coil moves relative to the permanent magnets, the actuator body pivots about the pivot shaft and the heads are moved across the disc surfaces.

The heads are supported over the discs by actuator slider assemblies which include air-bearing surfaces designed to interact with a thin layer of moving air generated by the rotation of the discs, so that the heads are said to "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of the data track and converts these to a signal which is decoded by read channel circuitry of the disc drive.

Control of the position of the heads is typically achieved with a closed loop servo system such as disclosed in U.S. Pat. No. 5,262,907 entitled HARD DISC DRIVE WITH IMPROVED SERVO SYSTEM, issued Nov. 16, 1993, to Duffy et al., assigned to the assignee of the present invention and incorporated herein by reference. In such a system, head position (servo) information is provided to the discs to detect and control the position of the heads. As will be recognized, a dedicated servo system entails the dedication of one entire surface of one of the discs to servo information, with the remaining disc surfaces being used for the storage of user data. Alternatively, an embedded servo system involves interleaving the servo information with the user data on each of the surfaces of the discs so that both servo information and user data is read by each of the heads. An example of an embedded servo system is disclosed in U.S. Pat. No. 5,136,439 entitled SECTORED SERVO POSITION DEMODULATOR SYSTEM, issued Aug. 4, 1992 to Weispfenning et al., assigned to the assignee of the present invention and incorporated herein by reference.

With either a dedicated or embedded servo system, it is common to measure or estimate various parameters including head position, velocity and acceleration and to use these parameters in the closed-loop control of the position of the head. For example, during track following, which involves causing the head to follow a selected track on the disc, a position error signal (PES) indicative of the relative distance between the head and the center of the selected track is generated from the servo information associated with the track. The PES is used to generate correction signals which adjust the position of the head by adjusting the amount of current applied to the actuator coil. Additionally, during a seek, which involves the acceleration and subsequent deceleration of the head from an initial track to a destination track on the disc, the radial velocity of the head is typically measured (or estimated) and compared to a profile velocity, with correction signals being generated from the differences between the actual velocity and the profile velocity of the head.

As track densities and rotational speeds of modern disc drives continue to increase, closed-loop control of head position becomes increasingly critical to ensure reliable performance of the drives. However, such increases in track density and rotational speed tend to reduce the accuracy in the measured or estimated parameters used to control the position of the heads. Thus, there is a continual need for improved approaches to accurately measuring or estimating the control parameters used in the servo loops of modern disc drives.

BRIEF SUMMARY OF THE INVENTION

The present invention provides an apparatus and method for improved positional control in a disc drive servo loop, wherein the actual velocity of a rotary actuator is sensed from the motion-induced back-emf generated by movement of a coil of the actuator through the magnetic field of a voice coil motor.

Accordingly, during servo loop operation in either a track following or seek mode, signals indicative of the voltages across a serial combination of the actuator coil and a current sense resistor are provided to a velocity sense circuit, which determines the velocity of the coil by generating and subtracting out values for the dc voltage drops across the coil and the current sense resistor and the instantaneous voltage drop across the coil. Particularly, a head velocity signal indicative of the rotary velocity of the head is generated and used in conjunction with other, conventionally obtained measurements or estimates of head velocity to provide improved servo control.

Additionally, a compensation routine is preferably provided to compensate for variations in coil resistance due to temperature changes during operation.

In one preferred approach, the head velocity signal is generated from hardware and provides the head velocity signal to a servo microprocessor; in an alternative approach, the servo microprocessor receives the necessary inputs and determines the head velocity signal therefrom.

An object of the present invention is to provide an improved servo system for a disc drive capable of controlling the position of heads in the disc drive having a relatively high track density.

Another object is to provide improved servo control during both track following and seek modes of operation.

Yet another object is to provide an additional head velocity estimate and use this estimate in conjunction with other head velocity parameters to improve the operation of the servo system.

Still another object is to facilitate higher track densities.

Other objects, advantages and features of the present invention will be apparent from the following description when read in conjunction with the drawings and appended claims.

BRIEF DESCRIPTION OF THE SEVERAL VIEWS OF THE DRAWINGS

FIG. 2 provides a schematic block diagram for the VCM control circuit, velocity sense circuit and the actuator coil of FIG. 1.

FIG. 3 provides a functional block diagram for the velocity sense circuit of FIGS. 1 and 2.

FIG. 4 provides a flow chart illustrating a VELOCITY SENSE CALIBRATION routine, performed in conjunction with the present invention.

FIG. 5 provides a flow chart illustrating a VELOCITY SENSE routine, performed in conjunction with the present invention.

DETAILED DESCRIPTION OF THE INVENTION

Figure 1:
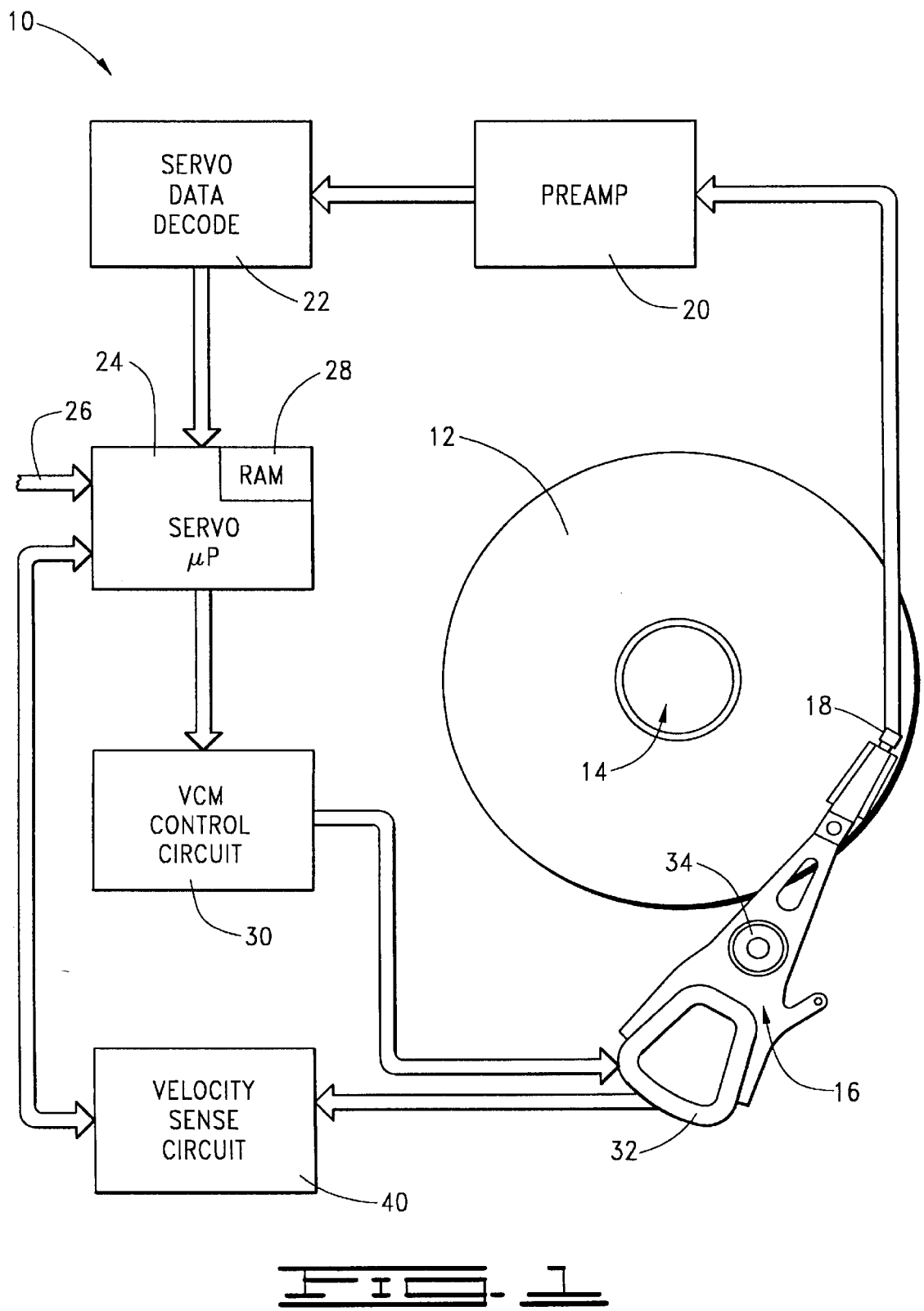
FIG. 1 is a functional block representation of a servo system for a disc drive constructed in accordance with the present invention.

Referring now to the drawings and more particularly to FIG. 1, shown therein is a functional block representation of a servo loop for a disc drive (generally denoted as 10) of the present invention. FIG. 1 shows the disc drive 10 to include a disc 12 which is rotated at a constant rotational velocity by a spindle motor (shown generally at 14). An actuator assembly 16 is mounted for controlled rotation adjacent the disc 12 and includes a head 18 used in the reading and writing of data from and to the disc 12.

During operation of the servo loop of FIG. 1 in a track following mode in which the head 18 is caused to follow a selected track (not shown) on the disc 12, servo information is read by the head 18 from the selected track and provided in the form of analog read signals to a preamplifier 20, which amplifies the signals accordingly. The amplified signals are provided to servo data decode circuitry 22, which includes analog-to-digital (A/D) and other decoding circuitry to provide digital representations of servo burst signals to a servo microprocessor 24. The magnitudes of the servo burst signals generally indicate the relative distance between the head 18 and the center of the selected track and are manipulated to form a position error signal (PES).

The servo microprocessor 24 generates correction signals from the PES in response to command signals provided from a disc drive system microprocessor (not shown) on signal path 26 as well as programming steps stored in RAM 28. The correction signals are provided to a VCM control circuit 30 in order to control the magnitude and polarity of current applied to a coil 32 of the actuator assembly 16. More particularly, as provided above, the correction signals are provided to an actuator driver circuit (not separately shown) of the VCM control circuit 30 which controls the amount of current that passes through the coil 32, as the coil 32 is immersed in a magnetic field of a VCM (not separately shown) generated from one or more high-field strength permanent magnets and associated flux paths (not separately shown), the interaction between the magnetic fields established by the current through the coil 32 with the magnetic field of the VCM causes the actuator assembly 16 to pivot about a bearing shaft assembly 34, causing the head 18 to move relative to the disc 12 accordingly.

Additionally, during operation of the servo loop of FIG. 1 in a seek mode wherein the head 18 is moved from an initial track to a destination track on the disc 12, track ID information is provided from the head 18 indicative of the position of the head 18 relative to the destination track. A velocity profile comprising a series of profile velocities is provided in RAM 28, each profile velocity indicative of the target velocity the head 18 is to have during the initial acceleration and the subsequent deceleration of the head 18 towards the destination track.

During the seek, the actual head velocity is measured (or estimated) and compared to the corresponding profile velocity from the velocity profile to generate a correction signal which is output by the servo microprocessor 24 to the VCM control circuit 30. Accordingly, the head 18 is caused to follow a seek trajectory defined by the velocity profile until the head 18 is settled on the destination track. Such servo operation during track following and seek modes is well known and discussed in greater detail in the previously incorporated Duffy reference, U.S. Pat. No. 5,262,907.

Additionally, FIG. 1 provides a velocity sense circuit 40, which is shown to be responsive to the coil 32 as well as the servo microprocessor 24. As discussed in greater detail below, the velocity sense circuit 40 operates to provide estimates of the radial velocity of the head 18 based upon the motion induced back-emf in the coil 32 during movement of the coil 32 relative to the VCM to improve servo control of the head 18 during track following and seek modes of operation.

Referring to FIG. 2, shown therein is a schematic block diagram of the VCM control circuit 30, the coil 32 and the velocity sense circuit 40 of FIG. 1 in greater detail. For reference, the VCM control circuit 30 comprises the extent of the components set forth in FIG. 2 except for the coil 32 and the velocity sense circuit 40.

FIG. 2 shows the coil 32 to be driven by a conventional h-bridge (shown generally at 42) connected between a regulated voltage source 44 (typically 12V) and ground 46. The h-bridge 42 comprises four FETs 48A, 48B, 48C and 48D. Thus, as will be recognized the magnitude and polarity of the current passing through the coil 32 can be readily controlled by the application of selected voltages to FET pairs 48A, 48D or 48B, 48C respectively. Such control is performed by a control circuit 50, which outputs control voltages to the FETs 48A–D in response to the aforementioned correction signals provided by the servo microprocessor 24 (of FIG. 1).

A current sense resistor 52 is shown to be connected in series with the coil 32, the current sense resistor 52 useful in providing closed loop control of the amount of current applied to the coil 32 by the control circuit 50. Particularly, signal paths 54 and 56 are connected across the current sense resistor 52 to provide the control circuit 50 with an indication of the voltage drop across, and hence the current through, the current sense resistor 52.

Continuing with FIG. 2, in accordance with the preferred embodiment of the present invention, signal paths 60, 62 and 64 connect selected points of the h-bridge 42 with the velocity sense circuit 40. Particularly, path 60 is connected to a point between the FETs 48A and 48C (generally identified as point "A"), path 62 is connected to a point between the coil 32 and the current sense resistor 52 (point "B") and path 64 is connected between the FETs 48B and 48D (point "C").

The voltages provided on paths 60, 62 and 64 allow the velocity sense circuit 40 to determine the radial velocity of the head 18 (FIG. 1) based upon the motion-induced back-emf in the coil 32. Particularly, it will be recognized that the total voltage drop across the coil 32 and the current sense resistor 52 (that is, between points A and C) can be stated as:

$$V_{AC}=L(dI/dt)+I(R_{COIL})+I(R_{RES})+\omega K_B \quad (1)$$

with L being the inductance of the coil 32, I the current through the coil 32 and the current sense resistor 52, dI/dt the change in the current per unit time, $R_{COIL}$ the dc resistance of the coil 32, $R_{RES}$ the dc resistance of the current sense resistor 52, $\omega$ the angular velocity of the coil 32 and $K_B$ a torque proportionality constant associated with the VCM and coil 32.

Thus, the total voltage drop across the coil 32 and the current sense resistor 52 is equal to the IR drops across the resistances of the coil 32 and the current sense resistor 52, the LdI/dt drop across the coil 32 (which can also be considered to be the current-induced back-emf by the coil 32) and the motion-induced back-emf in the coil 32 ($\omega K_B$), which is the voltage generated as a result of the movement of the coil 32 through the magnetic field of the VCM. By characterizing the remaining terms of equation (1), the quantity $\omega K_B$ can be determined, providing a representation of the velocity of the coil 32 and hence the head 18 (FIG. 1). As described more fully below, this measured velocity is then utilized in conjunction with other head velocity estimates or measurements to provide improved servo control for the disc drive 10. For reference, the signal at point A (path 60) is identified in FIG. 2 as "VCM+", the signal point at point B (path 62) is identified as "Is+" and the signal at point C (path 64) is identified as "Is−".

Referring now to FIG. 3, shown therein is a functional block diagram of the velocity sense circuit 40 of FIGS. 1 and 2 in greater detail. FIG. 3 shows the velocity sense circuit 40 to comprise a pair of differential amplifiers 66 and 68, which receive inputs from the paths 60, 62 and 64 as shown. The differential amplifier 66 compares the voltages on paths 60 (VCM+) and 64 (Is−) and generates an output signal on path 70 indicative of the total voltage drop across the coil 32 and the current sense resistor 52 (FIG. 2). In a similar manner, the differential amplifier 68 compares the voltages on paths 62 (Is+) and 64 (Is−) to generate an output signal on path 72 indicative of the current through the current sense resistor 52.

Both paths 70 and 72 are provided as inputs to a subtractor circuit 74, which generates an output signal on path 76 indicative of the dc voltage drop across the coil 32. The output signal from the differential amplifier 68 on path 72 is also provided as an input to a differentiator circuit 78, which differentiates the signal to provide an estimate of LdI/dt, the voltage drop across the coil 32, as a result of the time-rate of change of the current I through the current sense resistor 52.

The output of the differentiator circuit 78 is provided on path 80, which joins the path 76 at a summing junction 82 so that the signals representing the dc voltage drop across the coil 32 and the current-induced back-emf are summed and provided to a three stage, variable gain amplifier 84. The differential amplifier 66, the subtractor circuit 74 and the differentiator circuit 78 use a regulated reference voltage VREF1, which is preferably 6V.

The variable gain amplifier 84 also utilizes the VREF1 reference voltage in the first stage and utilizes a second reference voltage VREF2 in the second and third stages as shown. VREF2 is preferably less than VREF1 (for example, 3V) is selected to match the operating range of an analog-to-digital (A/D) converter 90 which receives the output of the variable gain amplifier 84 on path 88.

The output of the first stage of the variable gain amplifier 84 is an analog signal indicative of the term $\omega K_B$ from equation (1), referenced to VREF1. The second stage operates as a shifter to reference the $\omega K_B$ output to the VREF2 reference voltage and the third stage operates as a variable gain amplifier; that is, the third stage includes variable feedback (represented in FIG. 3 as a switch 86) which is controlled by the servo microprocessor 24 (FIG. 1) so that the velocity sense circuit 40 can be operated in both a seek mode and a track following mode.

The output from the variable gain amplifier 84 is converted to digital form by the A/D 90 and stored in a latch 92 in response to a latch signal from the servo microprocessor 24 (or path 94). The digital value (referred to as a "head velocity signal") is subsequently provided to the servo microprocessor 24 by way of path 96.

As provided above, the head velocity signal is indicative of the velocity of the head 18 and is used to improve servo control by the servo loop in conjunction with other head velocity measurements or estimates (obtained in a known manner). More particularly, it is contemplated that the head velocity signal can be used as an additional input to an estimator plant in an embedded servo system to estimate head position, velocity and acceleration. Alternatively, the head velocity signal can be averaged with the other head velocity measurements or estimates to obtain a final head velocity for use during the servo control. Further, the head velocity signal can be compared to the other head velocity measurements/estimates and an error flag can be set at such time that the difference between these signals exceeds a predetermined threshold, or the head velocity signal can be used as a substitution for erroneous head velocity measurements/estimates.

Moreover, it will be recognized that, depending upon a particular application, the head velocity signal generated by the velocity sense circuit 40 may be affected by changes in system parameters over time; for example, it is well known that the resistance of the coil 32 can vary with rises in temperature of the coil 32 as a result of repeated seeks in which large amounts of current are passed through the h-bridge 42 (FIG. 2). Such variations may affect the accuracy in the sensing of the velocity of the head 18 by the velocity sense circuit 40. As a result, a VELOCITY SENSE CALIBRATION routine, as shown in FIG. 4, is contemplated as being useful in such cases to improve the accuracy of the head velocity signal.

Referring to FIG. 4, the VELOCITY SENSE CALIBRATION routine begins by positioning the head 18 over a selected track, as shown at block 102. The track can be the initial track just prior to a seek so that the routine is performed at the beginning of each seek, or the routine can be performed periodically on a selected calibration track (or tracks) on the surface of the disc 12.

Once the head 18 is so positioned, constant current is applied to the coil 32 by the VCM control circuit 30 to maintain the actuator assembly 16 in a fixed relationship with respect to the disc 12, as shown by block 104. It will be recognized that bias forces as a result of windage and flex circuit bias will typically require a current of a selected magnitude in order to keep the actuator assembly 16 in this fixed relationship.

The current through the coil is then measured, as shown by block 106. This current can be measured, for example, by sensing the current through the current sense resistor 52 (FIG. 2), or by measuring the current from other points of the h-bridge 42 (such as points A and C). Depending upon the application, it may be desirable to individually determine the voltage drop across the coil 32 and the current sense resistor 52, or it may be sufficient to simply determine the voltage drop across both of these components in series.

The resistance of the coil 32 (or the coil 32 and the resistor 52) is then determined from the ratio of the corresponding voltage drop to the measured current, as shown by block 108. Once determined, this resistance is compared to a nominal value of resistance to generate a compensation value, as shown by block 110. This compensation value is thereafter used to scale "raw" head velocity signals from the velocity sense circuit 40 to obtain a "compensated" head velocity signals, either through direct adjustment (such as multiplying the raw head velocity signals by the compensation value) or through use of a look-up table stored in RAM 28, as indicated by block 112.

As an alternative to the velocity sense circuit 40 of FIG. 3, it is further contemplated that, given sufficient processing power is available during servo control, the functions performed by the velocity sense circuit 40 can be performed by the servo microprocessor 24 directly. FIG. 5 illustrates a VELOCITY SENSE routine, representative of programming stored in RAM 28 and used by the servo microprocessor 24 to generate the head velocity signal described above.

FIG. 5 begins at block 122, wherein the total voltage drop across the coil 32 and the current sense resistor 52 is determined by taking the difference between the VCM+ signal (point A) and Is− signal (point C). Similarly, the current through the current sense resistor 52 is determined by block 124 by taking the difference between the Is+ signal (path B) and the Is− signal (path C).

Next, block 126 determines the dc voltage drop across the coil 32 from the outputs of blocks 122 and 124. Block 128 determines the instantaneous (inductive) voltage drop across the coil 32 by differentiating the signal from block 124 (dc voltage drop across the coil). The outputs of blocks 124 and 128 are then summed at block 130 to generate the head velocity signal from the motion-induced back-emf of the coil 32. As will be recognized, the head velocity signal can be further scaled by a compensation value determined using the VELOCITY SENSE CALIBRATION routine of FIG. 4, as desired.

Once the head velocity is determined, it is compared to the head velocity estimate/measurement (determined in a conventional manner) as shown by block 132 and adjustments are made in the current applied to the coil 32 accordingly, as shown by block 134. Again, block 132 can comprise the use of the head velocity signal as an additional estimate in the estimator plant, the averaging of the two head velocity values, the comparison in magnitude of the two head velocity values, or other suitable means whereby the accuracy in the head velocity parameter can be optimized depending upon the particular application.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed with the spirit of the invention disclosed and as defined in the appended claims.

What is claimed is:

1. In a disc drive of the type including a disc and an actuator adjacent the disk, the actuator having a head and an actuator coil of a voice coil motor, the actuator coil having a dc resistance and an inductance, the disc having a surface including a plurality of nominally concentric tracks, the tracks including servo position fields read by the head to provide servo burst signals having magnitudes indicative of the position of the head with respect to the servo position fields, the disc drive further including control circuitry for applying current to the actuator coil to position the head with respect to the tracks and a current sense resistor in series with the actuator coil to provide feedback signals indicative of the magnitude of the current applied to the actuator coil, a method for controlling the position of the head relative to a selected track, the method comprising the steps of:

generating a combined voltage drop signal indicative of the combined voltage drop across the actuator coil and the current sense resistor;

generating a current signal indicative of the magnitude of current passing through the current sense resistor;

generating a dc voltage drop signal indicative of the dc voltage drop across the actuator coil from the current signal and the combined voltage drop signal;

generating an instantaneous voltage drop signal indicative of the instantaneous voltage drop across the actuator coil by:

differentiating the current signal to obtain a differentiated current signal; and multiplying the differentiated current signal and the inductance of the actuator coil;

summing the instantaneous voltage drop signal and the dc voltage drop signal to generate a velocity signal indicative of the velocity of the actuator coil; and using the velocity signal to control the position of the head relative to the disc.

2. The method of claim 1, further comprising the step of measuring the dc resistance of the actuator coil, comprising the steps of:

applying constant current to the actuator coil to maintain the radial position of the head with respect to the disc;

measuring the current passing through the actuator coil;

measuring the dc voltage drop across the actuator coil; and determining the dc resistance of the actuator coil from the ratio of the voltage drop across the actuator coil to the current passing through the actuator coil.

3. An apparatus for measuring the radial velocity of a head in a disc drive having a disc and an actuator controllably positionable with respect to the disc, the actuator including the head and a coil of a voice coil motor, the apparatus comprising:

a current sense resistor electrically connected in series with the coil;

control circuitry for controllably applying, current to the coil and the current sense resistor; and velocity sense circuitry responsive to the current sense resistor and the coil, the velocity sense circuitry measuring the motion-induced back emf in the coil as the coil is moved relative to the disc, wherein the velocity sense circuitry comprises:

a first differential amplifier, responsive to the current sense resistor and the coil, for generating a total voltage drop signal, the total voltage drop signal indicative of the total voltage drop across the current sense resistor and the coil;

a second differential amplifier, responsive to the current sense resistor, for generating a dc current signal, the dc current signal indicative of the magnitude of the current applied by the control circuitry to the coil and the current sense resistor;

a subtractor, responsive to the first and second differential amplifiers, for generating a coil voltage drop signal, the coil voltage drop signal indicative of the dc voltage drop across the coil;

a differentiator, responsive to the second differential amplifier, for differentiating the dc current signal to generate a differentiated dc current signal; and a summing junction, responsive to the subtractor and the differentiator, for summing the coil voltage drop signal and the dc current signal to generate a velocity signal indicative of the radial velocity of the head.

4. The apparatus of claim 3, further comprising:

an amplifier, responsive to the summing junction, for amplifying the velocity signal; and an analog-to-digital converter, responsive to the amplifier, for converting the amplified velocity signal to digital form.

5. The apparatus of claim 4, wherein the amplifier comprises a variable gain amplifier having at least two selectable gain levels corresponding to at least a track following mode and a seek mode, allowing the disc drive to obtain velocity measurements during track following and seek modes of operation through the selection of the gain level of the variable gain amplifier.

6. The apparatus of claim 4, wherein the disc drive further comprises a servo processor for controlling the position of the head with respect to the disc, and wherein the digital form of the amplified velocity signal is used by the servo processor to control the position of the head.

7. The apparatus of claim 3, further comprising compensation means for compensating for changes in resistance of the coil, the compensation means comprising:

coil resistance measurement means for measuring the resistance of the coil;

compensation value generation means, responsive to the coil resistance measurement means, for generating a compensation value from the measured resistance of the coil;

scaling means, responsive to the compensation value generation means, for scaling the velocity signal by the compensation value to provide a compensated velocity signal, the compensated velocity signal indicative of the radial velocity of the head and compensating for changes in resistance of the coil.

8. An apparatus for measuring the radial velocity of a head in a disc drive having a disc and an actuator controllably positionable with respect to the disc, the actuator including the head and a coil of a voice coil motor, the apparatus comprising:

a current sense resistor electrically connected in series with the coil;

a control circuitry for controllably applying current to the coil and the current sense resistor; and velocity sense circuitry responsive to the current sense resistor and the coil, the velocity sense circuitry measuring the motion-induced back emf in the coil as the coil is moved relative to the disc, wherein the velocity sense circuitry comprises a servo processor, the servo processor measuring the radial velocity of the head by:

generating a total voltage drop signal, the total voltage drop signal indicative of the total voltage drop across the current sense resistor and the coil;

generating a dc current signal, the dc current signal indicative of the magnitude of the current applied by the control circuitry to the coil and the current sense resistor;

generating a coil voltage drop signal, the coil voltage drop signal indicative of the dc voltage drop across the coil;

differentiating the dc current signal to generate a differentiated dc current signal; and summing the coil voltage drop signal and the dc current signal to generate a velocity signal indicative of the radial velocity of the head; and wherein the servo processor uses the velocity signal to control the position of the head.

9. The apparatus of claim 8, wherein the servo processor further compensates for changes in the resistance of the coil by:

measuring the resistance of the coil;

generating a compensation value from the measured resistance of the coil; and scaling the velocity signal by the compensation value to provide a compensated velocity signal, the compensated velocity signal indicative of the radial velocity of the head and compensating for changes in resistance of the coil; and wherein the servo processor uses the compensated velocity signal to control the position of the head.

10. A disc drive, comprising:

a rotatable disc;

an actuator assembly adjacent the disc which positions a read/write head over tracks defined on the disc in relation to current passed through a coil of the actuator assembly;

a current sense resistor of selected resistance connected in series with the coil;

a control circuit operably connected to the coil and the current sense resistor which selectively applies the current in a first direction so that the current passes through the coil and then through the current sense resistor, and a second direction so that the current passes through the current sense resistor and then through the coil, the first and second direction of current selected in relation to a desired radial movement of the read/write head; and a velocity sense circuit operably connected across the coil and the current sense resistor which generates a velocity signal indicative of a radial velocity of the read/write head relative to the disc in relation to a measured voltage drop across the coil and the current sense resistor and a measured resistance of the coil.

11. The disc drive of claim 10, wherein the velocity sense circuit comprises:

a first differential amplifier, responsive to the current sense resistor and coil pair, for generating a total voltage drop signal, the total voltage drop signal indicative of the total voltage drop across the current sense resistor and coil;

second differential amplifier, responsive to the current sense resistor, for generating a voltage drop signal, the voltage drop signal indicative of the magnitude of the voltage drop across the current sense resistor;

a subtractor, responsive to the first and second differential amplifiers, for generating a coil voltage drop signal, the coil voltage drop signal indicative of the dc voltage drop across the coil;

a differentiator, responsive to the second differential amplifier, for differentiating the dc current signal to generate a differentiated dc current signal;

a summing junction, responsive to the subtractor and the differentiator, for summing the coil voltage drop signal and the dc current signal to generate a velocity signal indicative of the radial velocity of the head;

an analog-to-digital converter, responsive to the amplifier, for converting a, the amplified velocity signal to digital form; and an amplifier, responsive to the summing junction, for amplifying the velocity signal, wherein the amplifier comprises a variable gain amplifier having at least two selectable gain levels corresponding to at least a track following mode and a seek mode, allowing the disc drive to obtain velocity measurements during track following and seek modes of operation through the selection of the gain level of the variable gain amplifier.

12. The disc drive of claim 10, wherein the velocity sense circuit comprises a servo processor having associated programming to generate the velocity signal indicative of the radial velocity of the head by:

generating a total voltage drop signal, the total voltage drop signal indicative of the total voltage drop across the current sense resistor and coil pair;

generating a current sense resistor voltage drop signal, the voltage drop signal indicative of the magnitude of the voltage drop across the current sense resistor;

generating a coil voltage drop signal, the coil voltage drop signal indicative of the dc voltage drop across the coil;

differentiating the current sence resistor voltage drop to generate a differentiated dc current signal; and summing the coil voltage drop signal and the dc current signal to generate a velocity signal indicative of the radial velocity of the head, wherein the servo processor uses the velocity signal to control the position of the head.

13. The disc drive of claim 12, wherein the servo processor is further provided with associated programming to compensate for changes in the resistance of the coil by:

deriving the resistance of the coil;

generating a compensation value from the derived resistance of the coil; and scaling the velocity signal by the compensation value to provide a compensated velocity signal, the compensated velocity signal indicative of the radial velocity of the head and compensating for changes in resistance of the coil, wherein the servo processor uses the compensated velocity signal to control the position of the head.

* * * * *